US006571347B1

(12) United States Patent
Tseng

(10) Patent No.: US 6,571,347 B1
(45) Date of Patent: May 27, 2003

(54) APPARATUS AND METHOD FOR INTELLIGENT COMPUTER INITIATION PROGRAM RECOVERY

(75) Inventor: Jing-Shiang Tseng, Hsinchu (TW)

(73) Assignee: Winbond Electronics Corporation, Taiwan (CH)

(*) Notice: Subject to any disclaimer, the term of this patent is extended or adjusted under 35 U.S.C. 154(b) by 0 days.

(21) Appl. No.: 09/317,107

(22) Filed: May 24, 1999

(51) Int. Cl.$^7$ ................................................ G06F 11/16
(52) U.S. Cl. ............................................ 714/6; 714/36
(58) Field of Search .................... 714/6, 7, 36, 54; 713/2

(56) References Cited

U.S. PATENT DOCUMENTS

| | | | | |
|---|---|---|---|---|
| 5,327,531 A | * | 7/1994 | Bealkowski et al. | 395/164 |
| 5,797,023 A | * | 8/1998 | Berman et al. | 713/1 |
| 5,802,592 A | * | 9/1998 | Chess et al. | 711/102 |
| 5,805,882 A | * | 9/1998 | Cooper et al. | 395/652 |
| 5,835,695 A | * | 11/1998 | Noll | 714/6 |
| 6,038,663 A | * | 3/2000 | Feldman | 713/1 |

FOREIGN PATENT DOCUMENTS

EP      1028371 A   *   8/2000            G06F/9/445

OTHER PUBLICATIONS

Microsoft Press Computer Dictionary, 1997, 3$^{rd}$ edition, p. 320.*

* cited by examiner

Primary Examiner—Scott Baderman
(74) Attorney, Agent, or Firm—Finnegan, Henderson, Farabow, Garrett & Dunner, L.L.P.

(57) ABSTRACT

An intelligent computer initiation program recovery apparatus includes a first memory containing a first computer initiation program wherein the first memory permits the stored first initiation program to be altered, a read-only-memory containing a second computer initiation program, and a circuit coupled to the first memory and the read-only-memory wherein the circuit calculates a value from the first program and compares the value against a predetermined value to enable the first memory when the value equals to the predetermined value and to enable the read-only-memory when the value differs from the predetermined value.

12 Claims, 2 Drawing Sheets

APPARATUS AND METHOD FOR INTELLIGENT COMPUTER INITIATION PROGRAM RECOVERY

BACKGROUND OF THE INVENTION

1. Field of the Invention

This invention pertains in general to an apparatus for storing a computer initiation program and, more particularly, to an apparatus and method for computer initiation program recovery.

2. Description of the Related Art

A computer initiation program, most commonly known as a BIOS program, provides an essential and indispensable function during the initial or "boot-up" process of a computer. To prevent the program from being edited, overwritten, or otherwise altered, the program has traditionally been stored in a read-only-memory ("ROM"). Recently, vendors have started to store BIOS programs in flash memories, a type of non-volatile memory that permit its contents to be reprogrammed electrically by anyone without having to remove the memory from the motherboard. By storing a BIOS program in a flash memory, the vendors allow users of the program to directly update the BIOS program or correct existing "bugs" in the program by, for example, posting new or updated programs on the Internet so that they may be downloaded by the users. Such an alternative may be economical compared to having to replace at least the ROM in which an outdated or defective BIOS program is stored.

Although storing the BIOS program in a flash memory may provide some convenience to users and vendors alike, unintended results may occur which may be fatal to computer operations, such as incorrect storage of a new or updated BIOS program or incomplete storage of the BIOS program due to power outage during the "burn-in" process. A computer virus may also infect the BIOS program. Each of these occurrences renders the computer system unable to function. Although the computer system may be initiated by using a BIOS program stored on a floppy disk, this remedy may not be immediately available, such as if a user does not possess such a disk or does not know how to use one. In addition, an experienced programmer of a computer virus may hide the virus in DRAMs to infect the BIOS program each time the computer system is initiated, even after the user has purged the flash memory of the virus.

SUMMARY OF THE INVENTION

Accordingly, the present invention is directed to an intelligent computer initiation program recovery apparatus that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structures and methods particularly pointed out in the written description and claims thereof, as well as the appended drawings.

To achieve these and other advantages, and in accordance with the purpose of the invention as embodied and broadly described, there is provided an intelligent computer initiation program recovery apparatus. The apparatus includes a first memory containing a first computer initiation program wherein the first memory permits the stored first initiation program to be altered, a read-only-memory containing a second computer initiation program, and a circuit coupled to the first memory and the read-only-memory wherein the circuit calculates a value from the first program and compares the calculated value against a predetermined value to enable the first memory when the calculated value equals the predetermined value and to enable the read-only-memory when the calculated value differs from the predetermined value.

In one aspect of the invention, the read-only-memory provides a warning when the calculated value differs from the predetermined value.

In another aspect of the invention, the circuit comprises a multiplexer coupled to the first memory and the read-only-memory for enabling one of the first memory and the read-only-memory.

In yet another aspect of the invention, the circuit comprises a logic circuit coupled to the multiplexer, wherein the logic circuit calculates the calculated value and compares the calculated value to the predetermined value, and wherein the logic circuit provides an output to the multiplexer.

In still another aspect of the invention, the apparatus further comprises a host coupled to the first memory, the read-only-memory and the circuit, wherein the host receives the first initiation program when the calculated value equals the predetermined value and receives the second initiation program when the calculated value differs from the predetermined value.

In yet another aspect of the invention, the circuit includes an AND gate to generate a reset signal wherein the AND gate has two inputs and receives a system reset signal on one of the two inputs.

Also in accordance with the invention, there is provided an intelligent computer initiation program recovery apparatus. The apparatus includes first means for storing a first computer initiation program and for permitting the stored first initiation program to be altered, second means for storing a second computer initiation program, and circuit means coupled to the first means and the second means for calculating a value from the first program and comparing the calculated value against a predetermined value to enable the first means when the calculated value equals the predetermined value and to enable the second means when the calculated value differs from the predetermined value.

In one aspect of the invention, the circuit means includes multiplexer means for enabling one of the first means and the second means, logic means coupled to the multiplexer means for calculating the calculated value and comparing the calculated value to the predetermined value, and gate means coupled to the logic means for generating a reset signal.

In another aspect of the invention, the apparatus further includes a host coupled to the gate means for receiving the reset signal, coupled to the first means for receiving the first initiation program when the calculated value equals the predetermined value, and coupled to the second means for receiving the second initiation program when the calculated value differs from the predetermined value.

Additionally in accordance with the invention, there is provided an intelligent computer initiation program recovery apparatus that includes a first memory for storing a first computer initiation program wherein the first memory permits the stored first initiation program to be altered, and a circuit coupled to the first memory wherein the circuit includes an embedded memory having stored therein a second initiation program, wherein the circuit calculates a value from the first program and compares the calculated value against a predetermined value, and wherein the circuit enables the first memory when the calculated value equals the predetermined value and enables the embedded memory when the calculated value differs from the predetermined value.

Also in accordance with the invention, there is provided a method for computer initiation program recovery. The method includes defining a predetermined reference value, calculating a value from a first computer initiation program stored in a first memory, comparing the calculated value to the predetermined reference value, enabling the first memory when the calculated value equals the predetermined reference value to provide access to the first computer initiation program stored therein, enabling a second memory containing a second computer initiation program when the calculated value differs from the predetermined reference value to provide access to the second computer initiation program stored therein, and providing a reset signal to a host system coupled to the first memory and the second memory wherein the host system receives one of the first computer initiation program and the second computer initiation program.

In one aspect of the invention, the predetermined reference value is the sum of the first initiation program address values.

In another aspect of the invention, the predetermined value is an address value identifying a product vendor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

Figure 1:
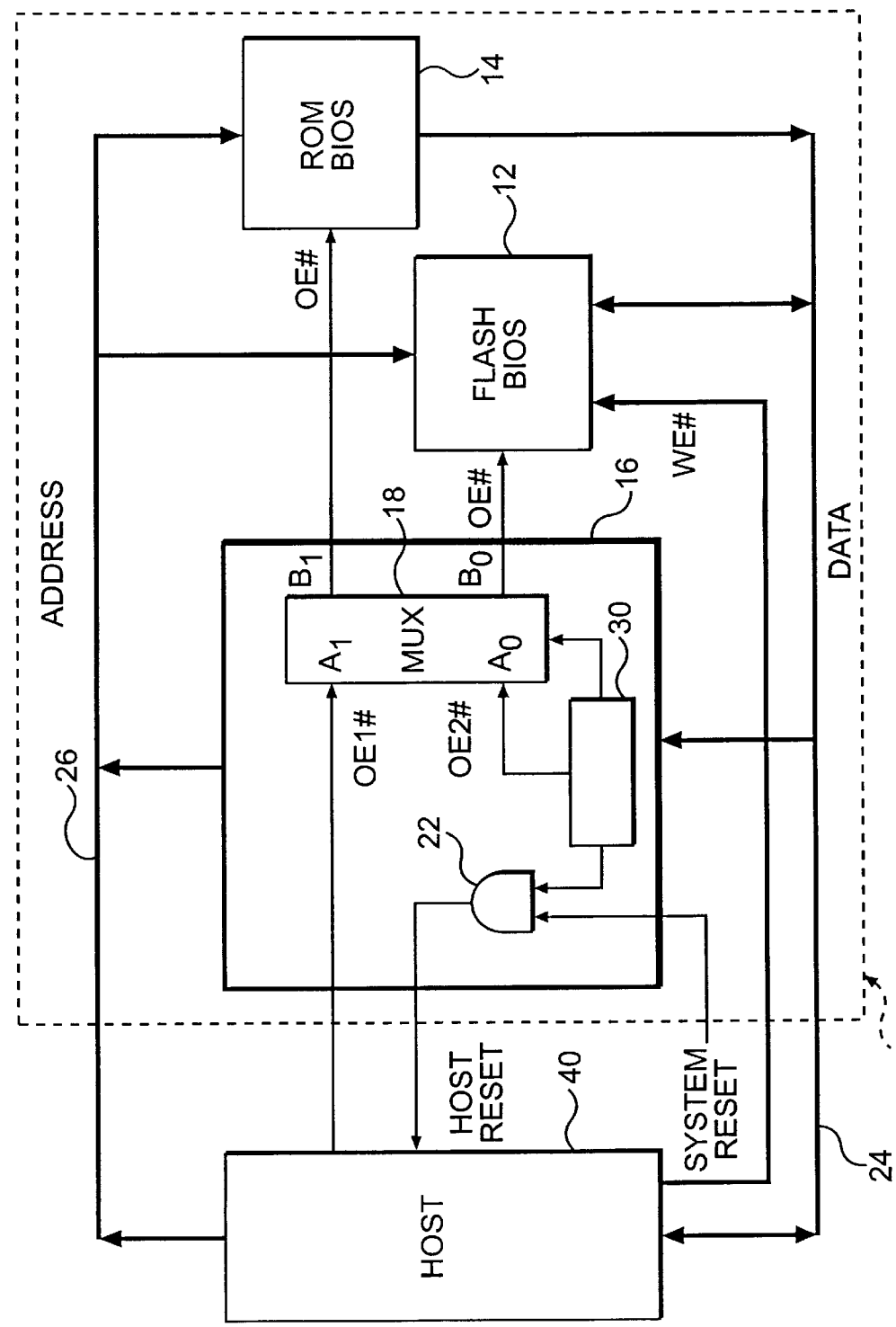
FIG. 1 is a block diagram of one embodiment of the apparatus constructed in accordance with the present invention.

In accordance with the present invention, there is provided an intelligent computer initiation recovery apparatus. FIG. 1 is a block diagram of one embodiment of an apparatus 10 constructed in accordance with the present invention. Referring to FIG. 1, apparatus 10 constructed in accordance with the present invention includes a flash memory 12, a ROM 14, and a selector circuit 16. Selector circuit 16 is coupled to flash memory 12 and ROM 14, and receives a System Reset signal, which is provided to selector circuit 16 when the system is first powered-up. Apparatus 10 is coupled to a host system 40. Specifically, host system 40 is coupled to flash memory 12 and ROM 14 through address bus 26 and data bus 24. Host system 40 also provides a Write_Enable signal to flash memory 12 and Output_Enable signal to selector circuit 16, and receives a Host Reset signal from selector circuit 16.

Flash memory 12 contains a computer initiation program, or BIOS program, used to boot-up host system 40 to which apparatus 10 is connected. Because the BIOS program is stored in flash memory, the program may be edited, altered, or over-written. ROM 14 stores the same BIOS program as does flash memory 12 before the program stored in flash memory 12 is altered in any manner. ROM 14 may be a Mask ROM, OTP ROM, EPROM, EEPROM, and a flash memory. Because ROM 14 provides a backup BIOS program sufficient to initiate program operations in case the program stored in flash memory 12 does not function properly, the contents of ROM 14 must not be altered or over-written. Therefore, if an EEPROM or a flash memory is used, the Write_Enable signal WE# should be prevented from reaching ROM 14 so that the memory only functions as a read-only-memory.

Selector circuit 16 is coupled to flash memory 12 and ROM 14. Selector circuit 16 calculates a value from the unaltered BIOS program stored in flash memory 12 and compares the value against a predetermined reference value to determine if the BIOS program is able to properly initiate host system 40. The reference value may be the sum of a functioning BIOS program's address values. In this case, selector circuit 16 will be programmed to calculate the sum of the address values of the BIOS program stored in flash memory 12 and compare the sum against the reference value. This may be referred to as a "checksum" function. Alternatively, the reference value may be the address or location where the product vendor is identified. Selector circuit 16 will accordingly determine if the product vendor identification is located at the reference address value. The BIOS program stored in flash memory 12 is accessed by selector circuit 16 through data bus 24.

After the value is compared against the predetermined reference value, if the value equals the predetermined reference value, then the BIOS program is functioning properly. Selector circuit 16 then provides an Output Enable signal OE# to flash memory 12 to, in effect, select flash memory 12 to provide the BIOS program to initiate the start-up process for host system 40. If, however, the value differs from the predetermined reference value, the BIOS program stored in flash memory 12 is not functioning properly and therefore will not be able to initiate host system 40. In such a case, selector circuit 16 provides Output Enable signal OE# to ROM 14, selecting the backup BIOS program stored in ROM 14 for the program initiating process. ROM 14 also contains a program to provide an audible or text warning through an output device (not shown), such as an alarm or monitor, to inform the user that the BIOS program stored in flash memory 12 contains errors. By selecting ROM 14, host system 40 can still be properly initialized and, at the same time, the user is informed that the BIOS program stored in flash memory 12 must be purged. After either flash memory 12 or ROM 14 has been selected, selector circuit 16 provides a Host Reset signal to host system 40 to begin the start-up procedure.

Selector circuit 16 may be a microcontroller or any application specific integrated circuit programmed to perform the aforementioned functions. In another embodiment, selector circuit 16 includes a multiplexer circuit 18, a control logic circuit 20, and an AND gate 22. Multiplexer circuit 18 has outputs coupled to flash memory 12 and ROM 14 and receives input signals from logic circuit 20 and host system 40. Depending upon a signal OE2# received from logic circuit 20, multiplexer circuit 18 provides Output Enable signal OE# to enable either flash memory 12 or ROM 14 such that host system 40 may access the BIOS program stored in the enabled component.

Logic circuit 20 provides signal OE2# to multiplexer circuit 18 and an output to AND gate 22. Logic circuit 20 provides signal OE2# of a first value to multiplexer circuit 18 to calculate a value from the BIOS program stored in flash memory 12 based on data it reads therefrom via data bus 24. Logic circuit 20 then compares the value to the predetermined value. If the value is equal to the predetermined value, logic circuit 20 selects flash memory 12. Host system 40 then provides signal OE1# to multiplexer circuit 18, which provides Output Enable signal OE#, to access flash memory 12. However, if the calculated value differs from the predetermined value, logic circuit 20 provides signal OE2# of a second value to select ROM 14. Host system 40 then provides signal OE1# to multiplexer circuit 18, which then provides Output Enable signal OE#, to access ROM 14.

Logic circuit 20 also provides a signal to one of two inputs of AND gate 22. The other input of AND gate 22 receives the System Reset signal, which is provided to AND gate 22 when the system is first powered-up. After the selection of the BIOS program is complete, logic circuit 20 provides a signal to AND gate 22 which, together with the System Reset signal, causes AND gate 22 to output a Host Reset signal to host system 40 to begin the host system initiation process.

Host system 40 provides a first Output_Enable signal OE1# to selector circuit 16, specifically to multiplexer circuit 18. After multiplexer circuit 18 selects either flash memory 12 or ROM 14, host system 40 provides first Output_Enable signal OE1# to multiplexer circuit 18, which is provided to the selected component as OE#. When flash memory 12 is enabled, host system 40 receives the BIOS program stored therein. If ROM 14 is enabled instead, host system 40 receives the backup BIOS program stored therein and may display or relay to other devices (not shown) the warning provided from ROM 14 that the BIOS program stored in flash memory 12 contains errors.

Host system 40 may also provide a Write_Enable signal WE# to flash memory 12 so as to permit the contents of the memory to be altered or over-written. Host system 40, however, does not provide any Write_Enable signal to ROM 14. Host system 40 may be a microprocessor.

In another embodiment of the present invention (not shown), selector circuit 16 may be a microcontroller circuit with embedded memory. In this embodiment, the backup BIOS program is stored in the embedded memory, obviating a separate read-only-memory. However, the embedded memory should be a read-only memory. The microcontroller circuit would include the same components described above and perform the same functions described above.

Figure 2:
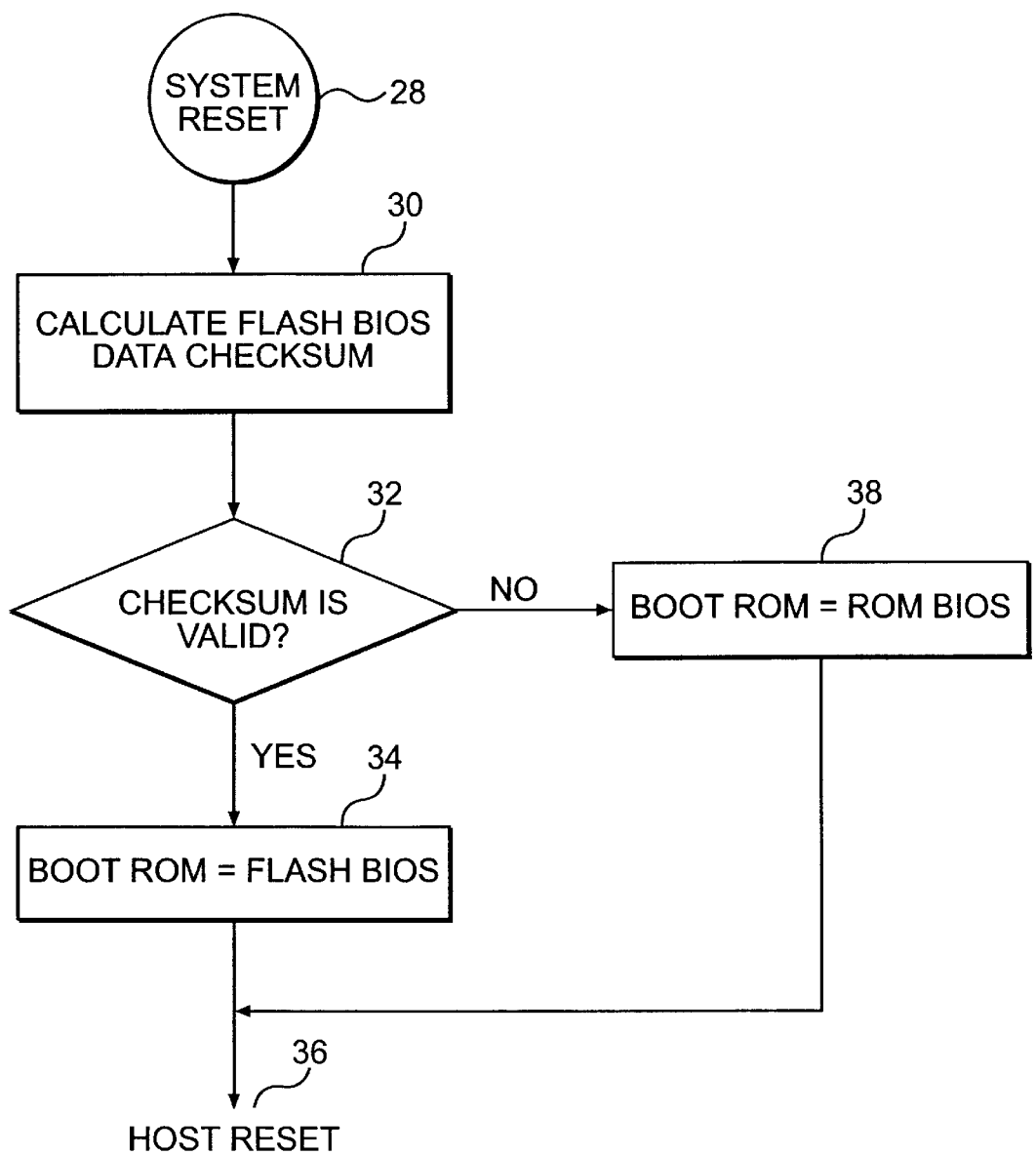
FIG. 2 is a flow chart showing an operation according to the method of the present invention.

FIG. 2 is a flow chart showing the operation steps of the present invention. The system is reset at step 28. Apparatus 10 of the invention then calculates a value from the BIOS program stored in flash memory 12 at step 30. The value is then compared to a predetermined reference value at step 32, or a "checksum" step. If the values are the same, flash memory 12 is selected at step 34 and then a Host Reset is provided to host system 40 at step 36. If the values are different, ROM 14 is selected at step 38 and a Host Reset is provided to host system 40 at step 36.

The present invention may be applicable on any computer component that requires initialization, including motherboards, display cards and modems. In addition, it will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An intelligent computer initiation recovery apparatus, comprising:

a first memory containing a first computer initiation program wherein the first memory permits said first initiation program to be altered;

a read-only-memory containing a second computer initiation program;

a circuit coupled to the first memory and the read-only-memory, the circuit comprising an AND gate for generating a reset signal, said AND gate having a first input and a second input, and the first input for receiving a system reset signal, wherein said circuit calculates a value from the first program and compares said calculated value against a predetermined value to enable the first memory to provide access to the first program when said calculated value equals the predetermined value and to enable the read-only-memory to provide access to the second program when said calculated value differs from the predetermined value;

a host coupled to the first memory, the read-only memory, and the circuit, the host, in response to the reset signal, receiving the first initiation program when the calculated value equals the predetermined value and receiving the second initiation program when the calculated value differs from the predetermined value, wherein the circuit provides the reset signal to the host after enabling one of the first memory and the read-only-memory, and wherein the read-only-memory causes an audio/visual warning to be produced when said calculated value differs from the predetermined value.

2. The apparatus of claim 1, wherein said predetermined value is the sum of said first initiation program address values.

3. The apparatus of claim 1, wherein said predetermined value is an address value identifying a product vendor.

4. The apparatus of claim 1, wherein said circuit comprises a multiplexer coupled to said first memory and said read-only-memory for enabling one of said first memory and said read-only-memory.

5. The apparatus of claim 1, wherein said host comprises a microprocessor.

6. The apparatus as claimed in claim 1, wherein said circuit comprises a logic circuit for calculating said calculated value and comparing said calculated value to said predetermined value, said logic circuit providing an output to the second input of said AND gate.

7. An intelligent computer initiation recovery apparatus, comprising:

first means for storing a first computer initiation program, and for permitting said first initiation program to be altered;

second means for storing a second computer initiation program; and circuit means, coupled to the first means and the second means, comprising:

logic means for calculating a value from the first program and comparing said calculated value to a predetermined value;

multiplexer means, coupled to the logic means, to enable the first means when said calculated value equals the predetermined value and to enable the second means when said calculated value differs from the predetermined value; and gate means coupled to said logic means for generating a reset signal after enabling one of said first means and said second means, wherein the second means causes an audio/visual warning to be produced when said calculated value differs from the predetermined value.

8. The apparatus as claimed in claim 7 further comprising a host coupled to said gate means for receiving said reset signal, coupled to said first means for receiving said first program when said calculated value equals said predetermined value, and coupled to said second means for receiving said second program when said calculated value differs from said predetermined value.

9. An intelligent computer initiation program recovery apparatus, comprising:

a first memory for storing a first computer initiation program, the first memory permitting the stored initiation program to be altered; and a circuit coupled to the first memory, said circuit including an embedded memory having stored therein a second initiation program, wherein the circuit comprises:

a logic circuit for calculating a value from the first program and comparing said calculated value to a predetermined value;

a multiplexer, coupled to the logic circuit, to enable the first memory when said calculated value equals the predetermined value and to enable the embedded memory when said calculated value differs from the predetermined value; and a gate coupled to said logic circuit to generate a reset signal after enabling one of the first memory and the embedded memory, wherein the embedded memory provides a warning when said calculated value differs from the predetermined value.

10. A method for computer initiation program recovery, comprising:

defining a predetermined reference value;

calculating, via a logic circuit, a value from a first computer initiation program stored in a first memory;

comparing, via the logic circuit, said calculated value to said predetermined reference value;

enabling said first memory when said calculated value equals said predetermined reference value to provide access to said first computer initiation program stored therein;

enabling a second memory containing a second computer initiation program when said calculated value differs from said predetermined reference value to provide access to said second computer initiation program stored therein;

providing, via the logic circuit, a reset signal to a host system coupled to said first memory and said second memory after enabling one of said first memory and said second memory;

receiving, by the host system, the first computer initiation program when said calculated value equals said predetermined reference value;

receiving, by the host system, the second computer initiation program when the calculated value differs from the predetermined reference value; and causing an audio/visual warning to be produced by the host system when said calculated value differs from said predetermined reference value, wherein said warning is perceivable by a user of the host system.

11. The method as claimed in claim 10 wherein said predetermined reference value is the sum of said first initiation program address values. is an address value identifying a product vendor.

12. The method as claimed in claim 10 wherein said predetermined value is an address value identifying a product vendor.

* * * * *